(12) United States Patent
Sugiyama et al.

(10) Patent No.: US 11,387,638 B2
(45) Date of Patent: Jul. 12, 2022

(54) ELECTRIC CONNECTION BOX

(71) Applicant: YAZAKI CORPORATION, Tokyo (JP)

(72) Inventors: Takashi Sugiyama, Makinohara (JP); Kuninori Suzuki, Makinohara (JP); Norio Watanabe, Makinohara (JP); Yuji Sashida, Makinohara (JP); Toshihisa Yagi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 78 days.

(21) Appl. No.: 17/096,914

(22) Filed: Nov. 12, 2020

(65) Prior Publication Data
US 2021/0143622 A1 May 13, 2021

(30) Foreign Application Priority Data
Nov. 13, 2019 (JP) .............................. JP2019-205562

(51) Int. Cl.
*H02G 3/08* (2006.01)
*H02G 3/14* (2006.01)

(52) U.S. Cl.
CPC .............. *H02G 3/14* (2013.01); *H02G 3/081* (2013.01)

(58) Field of Classification Search
CPC .......... H02G 3/08; H02G 3/081; H02G 3/088; H02G 3/16; H02G 3/14; H05K 5/00; H05K 5/02; H05K 5/04; B60R 16/00; B60R 16/0239; B60R 16/02; B60R 16/0238; H01H 9/02; H01H 9/04

USPC ................... 174/50, 520, 500, 59, 559, 560; 439/76.1, 76.2, 949, 535; 361/600, 601, 361/679.01, 730, 752; 220/3.2–3.9, 4.02
See application file for complete search history.

(56) References Cited

U.S. PATENT DOCUMENTS

| | | | | |
|---|---|---|---|---|
| 5,574,254 A * | 11/1996 | Mori | ...................... | H02G 3/088 174/561 |
| 5,864,091 A * | 1/1999 | Sumida | .................. | H02G 3/088 174/50 |
| 6,455,768 B2 * | 9/2002 | Negishi | .................. | H05K 5/061 174/50 |
| 6,462,270 B1 * | 10/2002 | Depp | ...................... | H02G 3/081 174/59 |

(Continued)

FOREIGN PATENT DOCUMENTS

| | | |
|---|---|---|
| EP | 2 190 090 A1 | 5/2010 |
| JP | 2001-72116 A | 3/2001 |

(Continued)

*Primary Examiner* — Angel R Estrada
(74) *Attorney, Agent, or Firm* — Kenealy Vaidya LLP

(57) ABSTRACT

An electric connection box includes a housing having an opening defined by an upper end of side walls, a lock protruding plate, a lid including a hanging wall and to be attached to the housing, a hook, an inner wall protruding from the lid and a notch being obtained by cutting a lower tip end of the inner wall. The hanging wall is, when the lid is attached to the housing, to cover an outer side of side walls. The hook is to rotate the lid such that the lid is attached to the housing. The inner wall is to, when the lid is attached to the housing, to sandwich the one of the plurality side walls between the hanging wall. The notch is formed on the inner wall in a second portion corresponding to a first portion of the hanging wall on which the hook is provided.

5 Claims, 10 Drawing Sheets

(56) References Cited

U.S. PATENT DOCUMENTS

| | | | | |
|---|---|---|---|---|
| 6,545,217 B2* | 4/2003 | Sato | ............... | H02G 3/088 |
| | | | | 174/64 |
| 6,629,619 B2* | 10/2003 | Sato | ............... | H02G 3/088 |
| | | | | 220/4.02 |
| 7,017,764 B2* | 3/2006 | Okada | ............ | H05K 7/026 |
| | | | | 174/50 |
| 9,819,168 B2* | 11/2017 | Shiraki | ......... | H02G 3/088 |
| 10,305,267 B2* | 5/2019 | Kawada | ......... | H02G 3/081 |
| 2017/0207614 A1 | 7/2017 | Shiraki | | |

FOREIGN PATENT DOCUMENTS

| | | |
|---|---|---|
| JP | 2016-96676 A | 5/2016 |
| JP | 2016-127640 A | 7/2016 |

\* cited by examiner

ELECTRIC CONNECTION BOX

CROSS-REFERENCE TO RELATED APPLICATION

The present application claims priority to Japanese Patent Application No. 2019-205562 filed on Nov. 13, 2019, the entire content of which is incorporated herein by reference.

TECHNICAL FIELD

The present disclosure relates to an electric connection box.

BACKGROUND

A related art electric connection box is mounted on a vehicle to accommodate electrical components. A lid of the electric connection box is generally attached to a housing having an opening by vertical fitting in which the lid is fitted from above toward the housing. However, in an attachment place where a fair workspace cannot be ensured above the housing, such as an engine compartment of a vehicle, an electric connection box of rotational fitting may be applied (for example, see JP2016-96676A). In an electric connection box 501 of this type as illustrated in FIG. 8, a lid 505 is inserted into a narrow space above a housing 503, a hook 507 provided on an end of the lid 505, from which the lid 505 is inserted into the space, is engaged with a lock protruding plate 509 of the housing 503, the lid 505 is rotated about the hook 507 in a frontward direction f, and a rotation tip end portion 511 of the lid 505 is locked to the housing 503 via a lock portion 513 illustrated in FIG. 9.

However, depending on a specification or the like of a vehicle on which the electric connection box 501 of rotational fitting is mounted, the lid 505 may be desired to be attached in a vertical fitting manner. In this case, the hook 507, which originally is configured to tilt the lid 505 forward in an insertion direction and engages an inner hole 515 illustrated in FIG. 10 with the lock protruding plate 509, abuts the lock protruding plate 509 from a straight upward direction U. The hook 507 pressed against the lock protruding plate 509 from right above is elastically deformed outward, and then the inner hole 515 is engaged with the lock protruding plate 509 as illustrated in FIG. 8. However, as illustrated in FIG. 10, when the hook 507 is elastically deformed in an outward direction e, an inner wall 519 of the lid 505 that is connected to a hanging wall 517 may also be pulled and moved in the outward direction e together with the hanging wall 517 including the hook 507. When the inner wall 519 of the lid 505 is displaced outward, a lower end 523 of the inner wall 519 interferes with an upper end of the side wall 521 of the housing 503, and the hook 507 may be brought into an unlocked state. In this state, a packing 525 attached between the hanging wall 517 and the inner wall 519 is detached from a packing abutment end surface 527 that is an upper end of the side wall 521, which may result in a decrease in water tightness. If the lower end 523 of the inner wall 519 is simply shortened in order to avoid interference, the assembly of the lid 505 may be completed with a low-water tightness in which the packing 525 is separated from the packing abutment end surface 527.

SUMMARY

Illustrative aspects of the present invention provide an electric connection box configured to prevent a situation in which of a hook, which is used in both cases in which the electric connection box employs rotational fitting and vertical fitting of the lid, cannot be locked, from occurring.

According to an illustrative aspect of the present invention, an electric connection box includes, a housing having an opening of a polygonal shape, the opening being defined by an upper end of each of a plurality of side walls, a lock protruding plate protruding from an outer surface of one of the plurality side walls, the one being along a side of the opening, a lid including a hanging wall and being configured to be attached to the housing while covering the opening, a hook having a frame shape and an inner hole, an inner wall protruding downward from the lid and extending parallel to the hanging wall and a notch being obtained by cutting a lower tip end of the inner wall. The hanging wall is configured, when the lid is attached to the housing, to cover an outer side of each of the plurality of side walls. The hook extends downward from an outer surface of the hanging wall and is configured to rotate the lid such that the lid is attached to the housing with the inner hole being engaged with the lock protruding plate. The inner wall is provided at an inner side than the hanging wall on the lid and is configured to, when the lid is attached to the housing, to sandwich the one of the plurality side walls between the hanging wall and the inner wall. The notch is formed on the inner wall in at least a second portion corresponding to a first portion of the hanging wall on which the hook is provided.

Other aspects and advantages of the invention will be apparent from the following description, the drawings and the claims.

DESCRIPTION OF EMBODIMENTS

Figure 1:
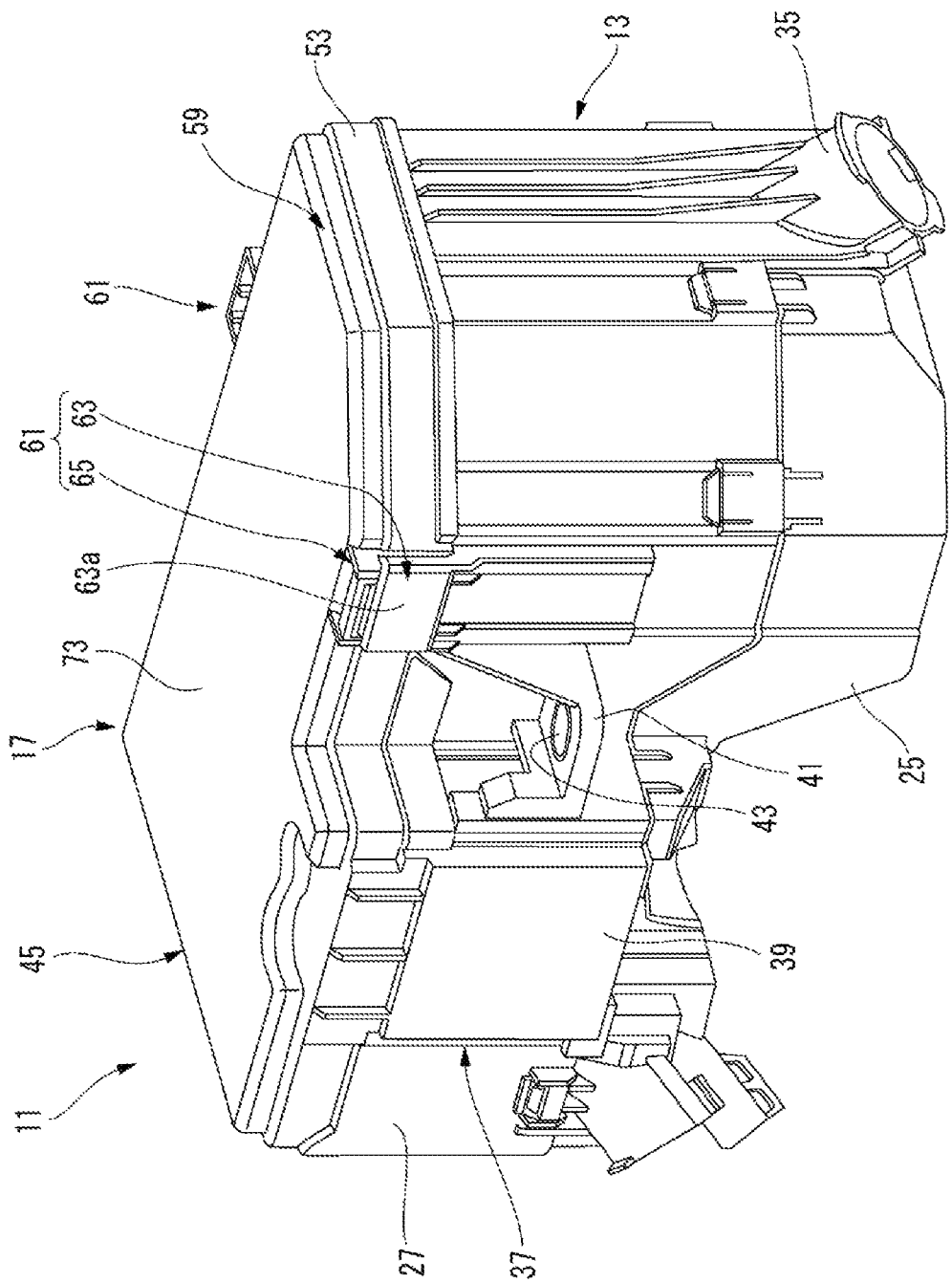
FIG. 1 is a perspective view illustrating an external appearance of an electric connection box according to an embodiment of the present disclosure.

Hereinafter, an embodiment according to the present disclosure will be described with reference to the drawings. FIG. 1 is a perspective view illustrating an external appearance of an electric connection box 11 according to the embodiment of the present disclosure. The electric connection box 11 according to the present embodiment is to be mounted on a vehicle, for example, and is interposed between a power supply (secondary battery) (not illustrated) of the vehicle and an electronic device to adjust power supplied from the power supply to the electronic device. The electric connection box 11 may also be referred to as a relay box, a fuse box, a connection box, or the like.

The electric connection box 11 according to the present embodiment includes a housing 13, lock protruding plates 15 projecting on an outer surface of a side wall 27 of the housing 13, a lid 17, hooks 19 formed on a hanging wall 53 of the lid 17, an inner wall 21 hanging down from the lid 17, the inner wall 21 being provided at an inner side than the hanging wall 53, and notches 23 obtained by cutting a lower tip end of the inner wall 21.

The housing 13 has a box shape defined by the side wall 27 (also referred to as a frame) and includes an under cover 25 attached at a lower portion thereof. The housing 13 has a polygonal opening 29 (see FIGS. 2 and 3) defined by upper ends on the entire periphery of the side wall 27. The upper ends of the side wall 27 serve as a packing abutment end surface 33 against which a packing 31 (see FIG. 3) attached on the lid 17 abuts when the lid 17 is attached to the housing 13. The housing 13 and the under cover 25 are formed of an insulating resin.

The housing 13 accommodates a plurality of electronic components (not illustrated). The electronic components accommodated in the housing 13 include, for example, a relay, a fuse, or a fusible link. Each of the electronic components includes an electronic component body (not illustrated) such as a relay body or a fuse body disposed inside the housing 13, and a plurality of terminals (not illustrated) that are electric connection portions electrically connected to the electronic component body. The terminals of the electronic component are electrically connected to electric wires (not illustrated). In the present specification, the electronic components, the terminals, the electric wires, and the like are collectively referred to as electrical components.

One end portion of an electric wire is connected to a terminal of an electronic component, and the other end portion is connected to the power supply (secondary battery) or the electronic device. The electric wire is drawn out to the outside of the housing 13 from a tubular electric wire insertion portion 35 formed on the housing 13. The plurality of electric wires drawn out from the housing 13 are bundled together by an exterior member such as an adhesive tape or a corrugated tube.

The side wall 27 of the housing 13 includes a cable connection portion 37 to which a power supply cable is connected. The cable connection portion 37 includes a terminal connection portion (not illustrated). A terminal attached to an end of the power supply cable is connected to the terminal connection portion. The cable connection portion 37 has its upper portion and side portion covered by a protective wall 39 that is formed on the lid 17 and hangs in parallel with the side wall 27. The cable connection portion 37 covered by the protective wall 39 leads the power supply cable out from below the protection wall 39.

The housing 13 includes a plurality of (two in this embodiment) fixing brackets 41 protruding outward from the side wall 27. Each of the fixing brackets 41 has a bolt insertion hole 43 passing therethrough. A bolt inserted into the bolt insertion hole 43 is fastened to a body panel, so that the electric connection box 11 is fixed in a predetermined position of an engine compartment, for example.

Figure 2:
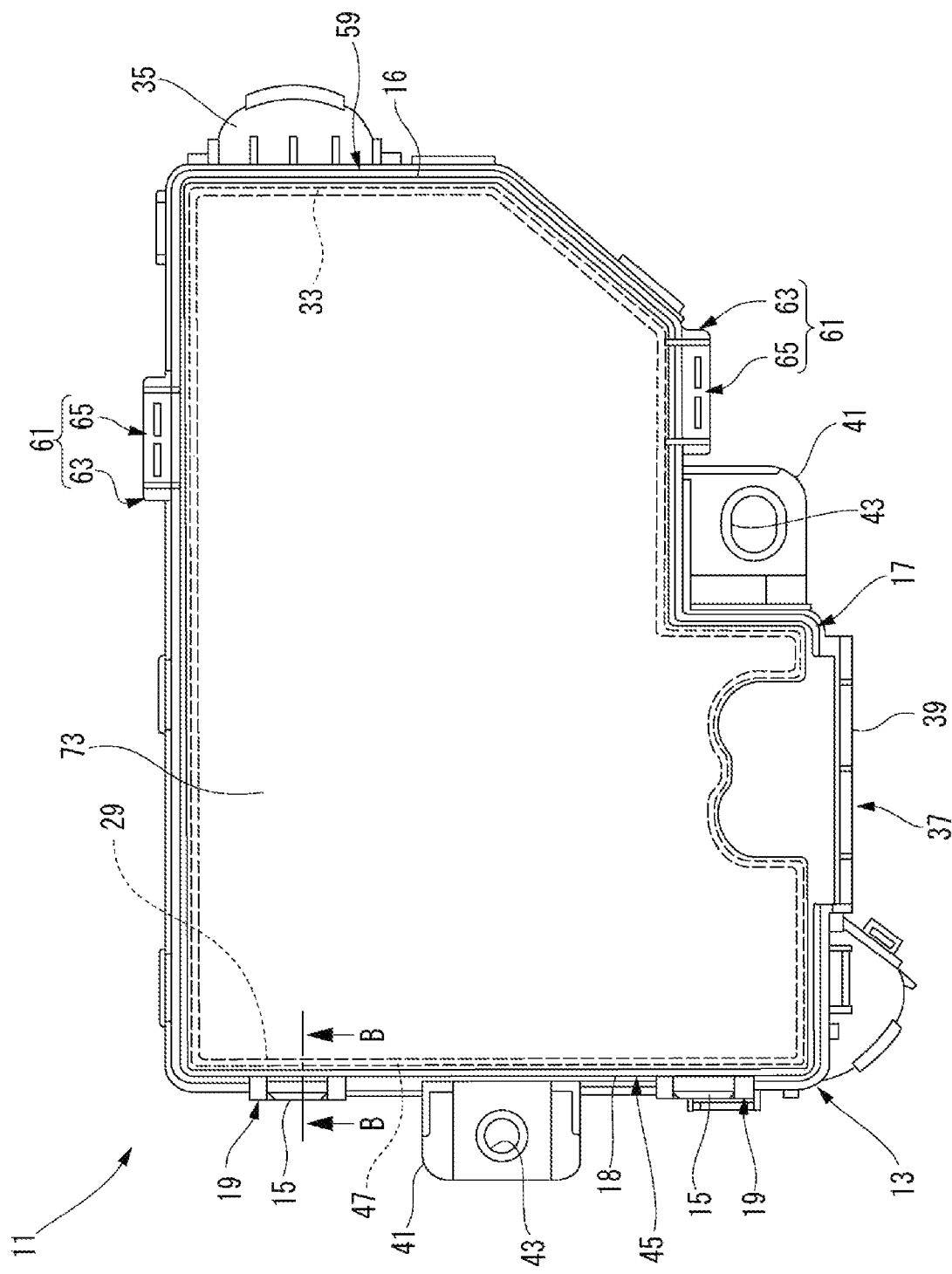
FIG. 2 is a plan view of the electric connection box in FIG. 1.

FIG. 2 is a plan view of the electric connection box 11 in FIG. 1. Here, the opening 29 and the lid 17 of the housing 13 have substantially similar shapes in a plan view. In the present embodiment, the polygonal shape is a heptagon obtained by cutting one corner portion of a rectangular shape by quadrangle to form a recess and chamfering a newly formed corner portion by the cut to form a hypotenuse. One of seven sides of the heptagon is a hypotenuse and the other sides are connected at right angles to adjacent sides. In addition, one corner portion of the polygon is an inside corner and the other corners are outside corners. The polygon is an example, and the shape of the electric connection box 11 according to the present embodiment is not limited to a polygon.

Figure 3:
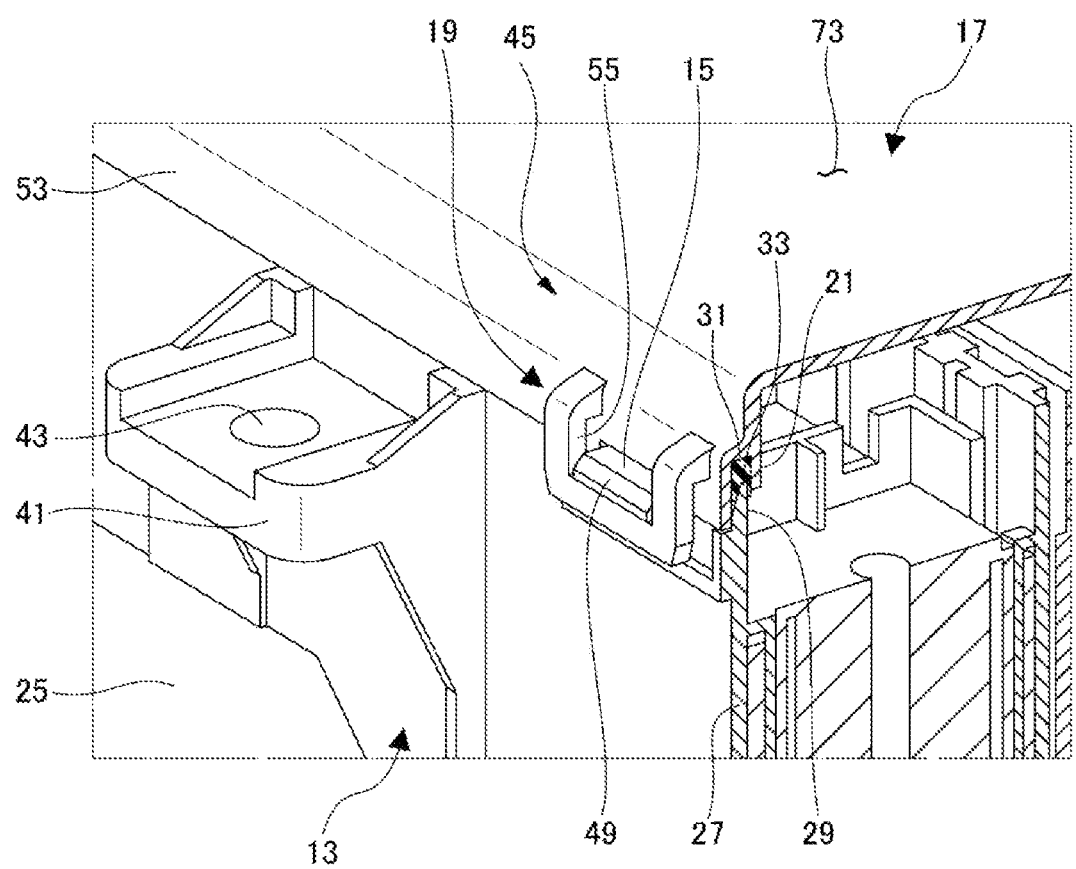
FIG. 3 is a perspective view of a main portion obtained by cutting a part representing a rotation base portion of a lid.

FIG. 3 is a perspective view of a main portion obtained by cutting a part representing a rotation base portion 45 of the lid 17. The lock protruding plates 15 project from the outer surface of the side wall 27 which is along a side 47 (see FIG. 2) of the opening 29. In the present embodiment, two lock protruding plates 15 are arranged apart from each other in a direction along the side 47. The lock protruding plate 15 is formed in a rectangular shape having a long side thereof along the side 47. The lock protruding plate 15 has an inclined top end surface 49 that inclines downward toward a projecting top end (i.e. tip end) on an upper surface thereof. The inclined top end surface 49 serves as a guide surface when the lid 17 is vertically fitted and attached to the housing 13. A lower surface of the lock protruding plate 15 opposite to the inclined top end surface 49 serves as a flat lock surface 51 (see FIG. 7) perpendicular to the side wall 27. The hook 19 of the lid 17 is hooked (locked) on the lock surface 51 of the lock protruding plate 15.

Figure 4:
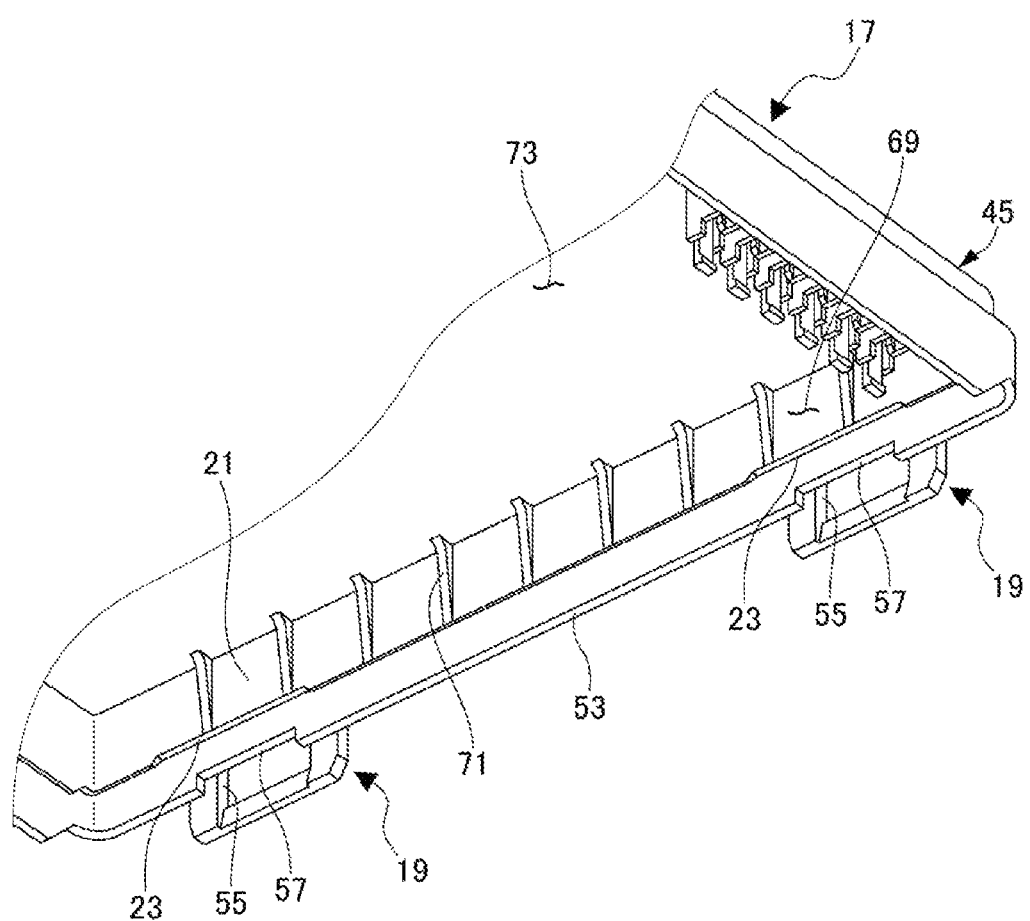
FIG. 4 is a perspective view of a main portion of the lid in FIG. 1 when viewed from obliquely below.

FIG. 4 is a perspective view of the lid 17 in FIG. 1 when viewed from obliquely below. The lid 17 includes the hanging wall 53 that covers the outer side of the side wall 27. The hanging wall 53 is formed around an entire periphery of the lid 17. In the lid 17, the frame-shaped hook 19 that engages with the lock protruding plate 15 is formed on the hanging wall 53 which is along the side 47 of the opening 29 when the lid 17 is attached to the housing 13. The hook 19 is hooked by inserting the lock protruding plate 15 into a quadrangle frame-shaped inner hole 55. Above the inner hole 55, there is formed an interference avoiding recess 57, which is configured to avoid interference between the hanging wall 53 and the lock protruding plate 15, by cutting a lower end of the hanging wall 53. By hooking the hook 19 on the lock protruding plate 15, the lid 17 engaged with the housing 13 is restricted from moving upward from the side 47 of the opening 29 and in a direction opposite to a projecting direction of the lock protruding plate 15.

When the lid 17 is rotationally fitted, the lid 17 is rotated about hooks 19 engaged with the lock protruding plates 15. The rotated lid 17 covers the opening 29 and is rotationally fitted to the housing 13. In the lid 17, a side 18 of the lid 17 which is along the side 47 of the opening 29 serves as the rotation base portion 45 (i.e., the sides 18 and 47 are the sides close to the rotational axis), and another side 16 opposite to the side 18 serves as a rotation tip end portion 59 (i.e., the side 16 is the side farthest from the rotational axis in the lid 17). When the lid 17 is attached to the housing 13 by rotational fitting, the rotation tip end portion 59 is pressed by an operator in a direction of approaching the housing 13 (i.e., a direction in which the lid 17 is attached to the housing 13).

The lid 17 is fixed to the housing 13 by the lock protruding plates 15, the hooks 19, and a plurality of lock portions 61 provided between the lid 17 and the housing 13 in both of rotational fitting and vertical fitting.

As illustrated in FIG. 2, a pair of lock portions 61 are provided in two positions of each of the lid 17 and the housing 13. The rotation tip end portion 59 of the lid 17 is interposed between the two positions. The lock portion 61 includes a housing-side lock 63 provided on the housing 13 and a lid-side lock 65 provided on the lid 17.

The housing-side lock 63 includes a lock wall 63a having a lock gap between the housing-side lock 63 and the side wall 27. The lock wall 63a includes a lock claw (not illustrated) projecting into the lock gap. The lid-side lock 65 includes a lock plate (not illustrated) to be inserted into the lock gap. The lock plate has a lock hole (not illustrated) to which the lock claw is locked.

Therefore, when the lid 17 is pressed down, the lock plate of the lid-side lock 65 of each of the lock portions 61 is inserted into the lock gap of the housing-side lock 63. When the lid 17 is further pressed down, the lock hole of the lock plate is locked to the lock claw of the lock wall 63a, so that the lid-side lock 65 is restricted from being separated from the housing-side lock 63. As a result, the lid 17 is fixed to the housing 13 by the pair of hooks 19 and the pair of lock portions 61.

Figure 5:
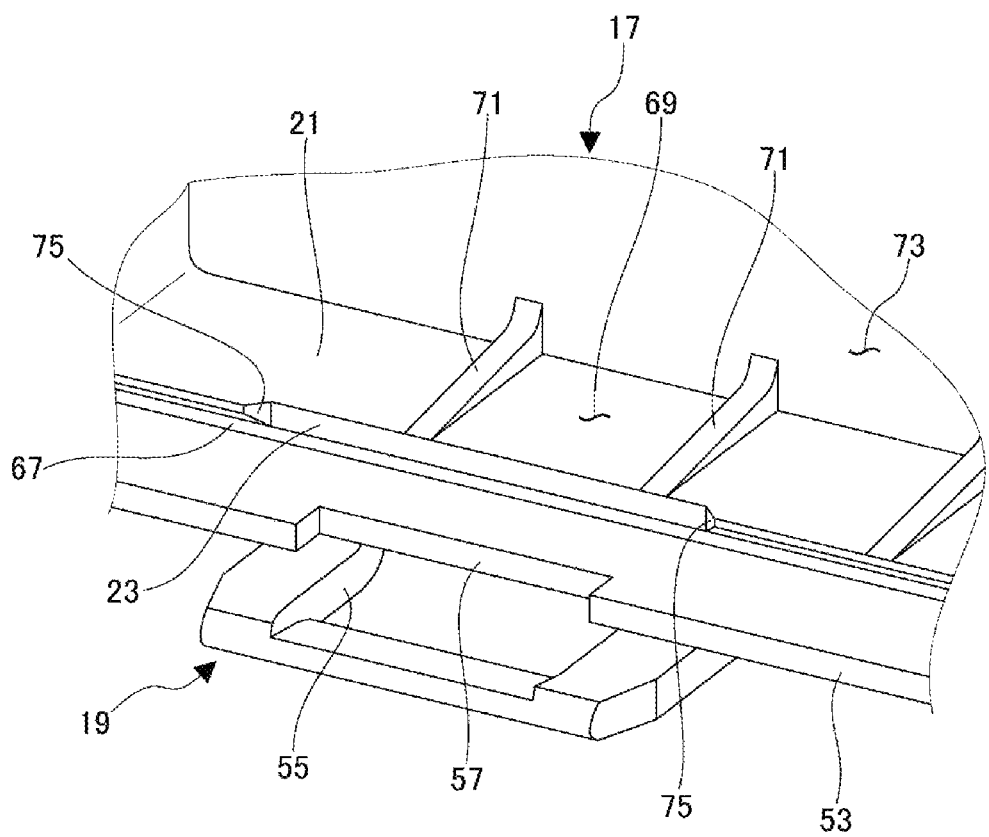
FIG. 5 is an enlarged view of a main portion of a hook in FIG. 4.

FIG. 5 is an enlarged view of a main portion of the hook 19 in FIG. 4. The inner wall 21 hangs from the lid 17 inside of the hanging wall 53 (i.e., the inner wall 21 is disposed at an inner side than the hanging wall 53). The inner wall 21 extends in parallel to the hanging wall 53, and, when the lid 17 is attached to the housing 13, is opposite to the hanging wall 53 with the side wall 27 sandwiched therebetween. As illustrated in FIG. 5, the inner wall 21 defines a packing accommodating groove 67 that opens downward, or, when the lid 17 is attached to the housing 13, toward the housing 13 and provided between the inner wall 21 and the hanging wall 53. The packing 31 is to be attached in the packing accommodating groove 67.

The packing 31 is formed in an annular shape made by a linear body having a quadrangle cross section and made of an elastic material such as rubber. The packing 31 is to be accommodated and held on a deep side (upper side in FIG. 7) of the packing accommodating groove 67. When the lid 17 is attached to the housing 13, the packing 31 abuts against the packing abutment end surface 33 that are the upper ends of the side wall 27 of the housing 13 with a predetermined pressing force. As a result, the elastically deformed packing 31 contacts the packing abutment end surface 33 in a pressed manner, and a space between the housing 13 and the lid 17 is sealed in a watertight manner.

The notches 23 are formed by cutting the lower tip end of the inner wall 21. Each of the notches 23 has its recessed bottom parallel to the lower tip end of the inner wall 21. The notches 23 are configured to be located in positions lower than an upper end of the side wall 27 when the lid 17 is fitted to the housing 13 (see a right view in FIG. 7), i.e., the lower tip end of the inner wall 21 where the notches 23 are provided is provided at a lower position than the upper end of the side wall 27 when the lid 17 is fitted to the housing 13. Therefore, the side wall 27 and the lower tip end of the inner wall 21 where the notches 23 are provided overlap in a horizontal/lateral direction (i.e., a direction orthogonal to the side wall 27) when the lid 17 is fitted to the housing 13.

At least one reinforcing rib 71 projects on an inner surface 69 of the inner wall 21 in a range corresponding to the notches 23. In the present embodiment, two reinforcing ribs 71 are provided. The reinforcing ribs 71 each include a base end connected to a top plate portion 73 of the lid 17, and reach the notches 23 with the height thereof from the inner surface 69 of the inner wall 21 gradually decreasing toward the notches 23. Since the reinforcing ribs 71 are provided on the inner wall 21 at portions where the notches 23 are formed, the inner wall 21 and the top plate portion 73 are coupled more firmly.

Figure 6:
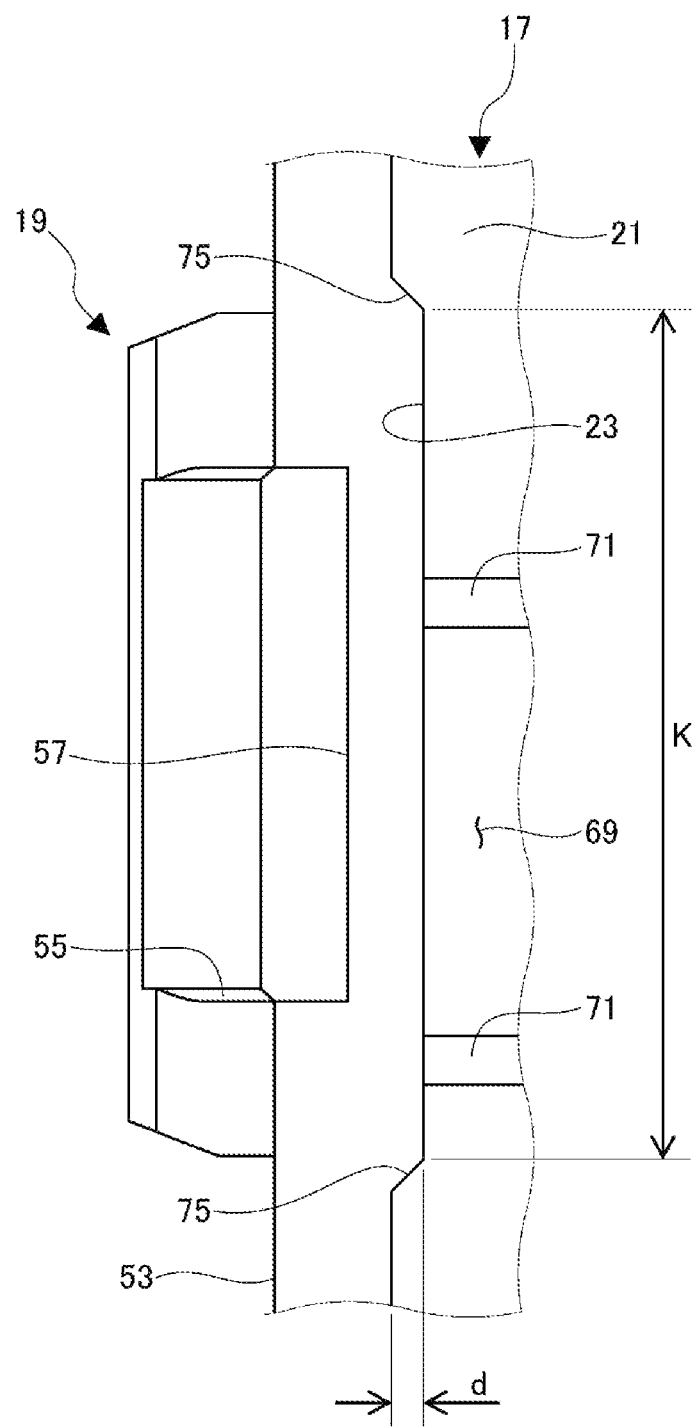
FIG. 6 illustrates the hook in FIG. 5 when viewed from inside of the lid.

FIG. 6 illustrates the hook 19 in FIG. 5 when viewed from inside of the lid 17. The notch 23 is formed at least in a range K of the inner wall 21 that corresponds to a range of the hanging wall 53 in which the hook 19 is formed. The notch 23 is formed by cutting off the lower tip end of the inner wall 21 by a length d, which is about 1.0 mm. The notch 23 is chamfered by chamfers 75 of about 1.0 mm, for example, at boundaries between the notch 23 and the lower tip end of the inner wall 21 (i.e., side ends of the notch 23 are chamfered with chamfers 75, whose length is about 1.0 mm).

Next, functions of the above configurations will be described. In the electric connection box 11 according to the present embodiment, the lid 17 can be attached to the housing 13 in two ways, that are rotational fitting and vertical fitting. In rotational fitting, the lid 17 is rotated about the hooks 19 with the hooks 19 provided on the lid 17 being engaged with the lock protruding plates 15 provided on the side wall 27. That is, a side of the lid 17 on which the hooks 19 are provided serves as the rotation base portion 45 (i.e., rotational axis), and a side opposite to the hooks 19 serves as the rotation tip end portion 59. The hooks 19 are provided on the hanging wall 53 formed on the outer periphery of the lid 17. The hanging wall 53 covers the outer side of the side wall 27 of the housing 13. When the lid 17 is rotated to a position where the hanging wall 53 covers the upper end of the side wall 27, the lock portions 61 provided on the lid 17 and the housing 13 lock so that the fixing of the lid 17 to the housing 13 is completed.

Figure 7:
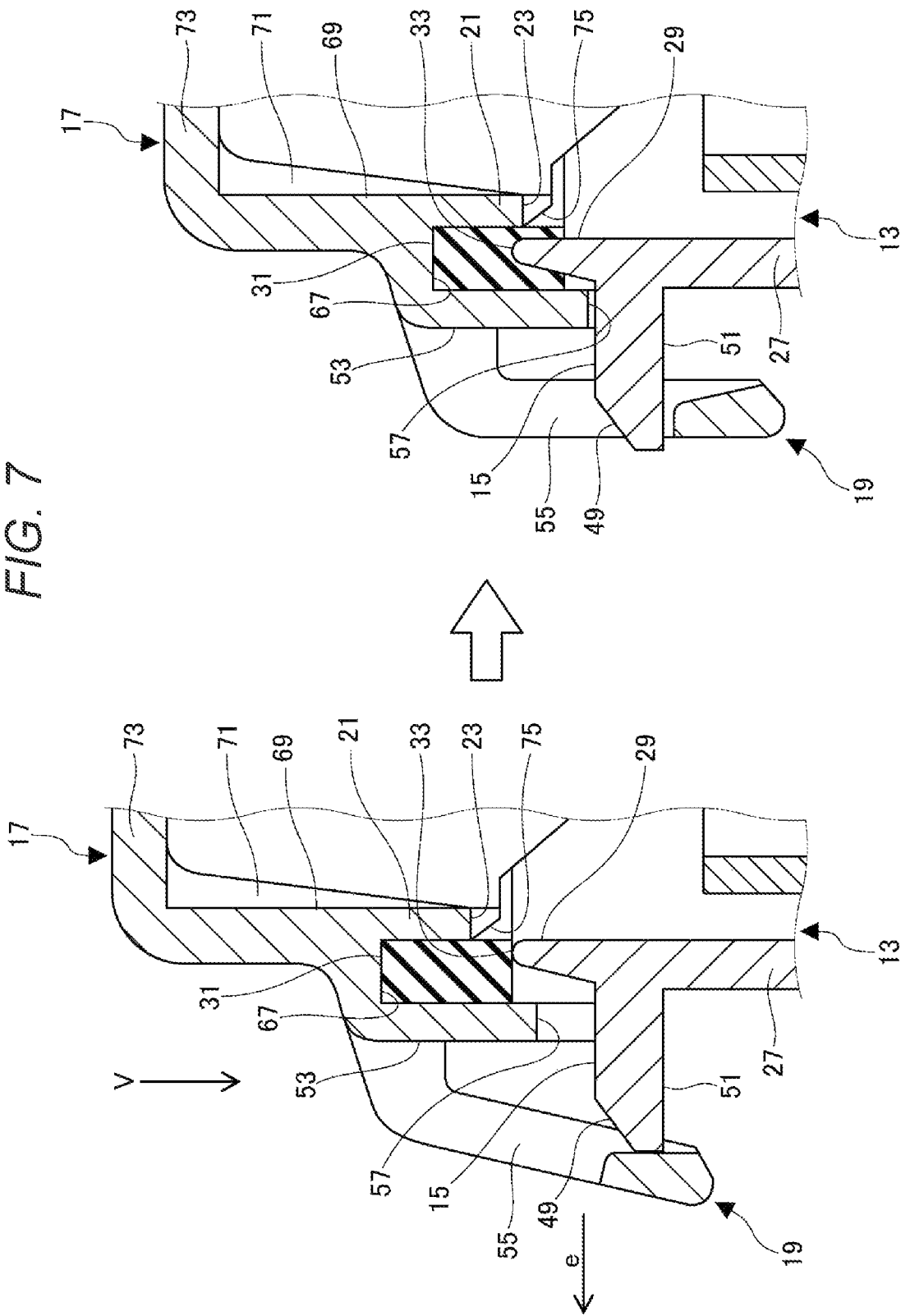
FIG. 7 is a sectional view taken along a line B-B in FIG. 2 and illustrates operation in a process for engaging the hook with a lock protruding plate.
Figure 8:
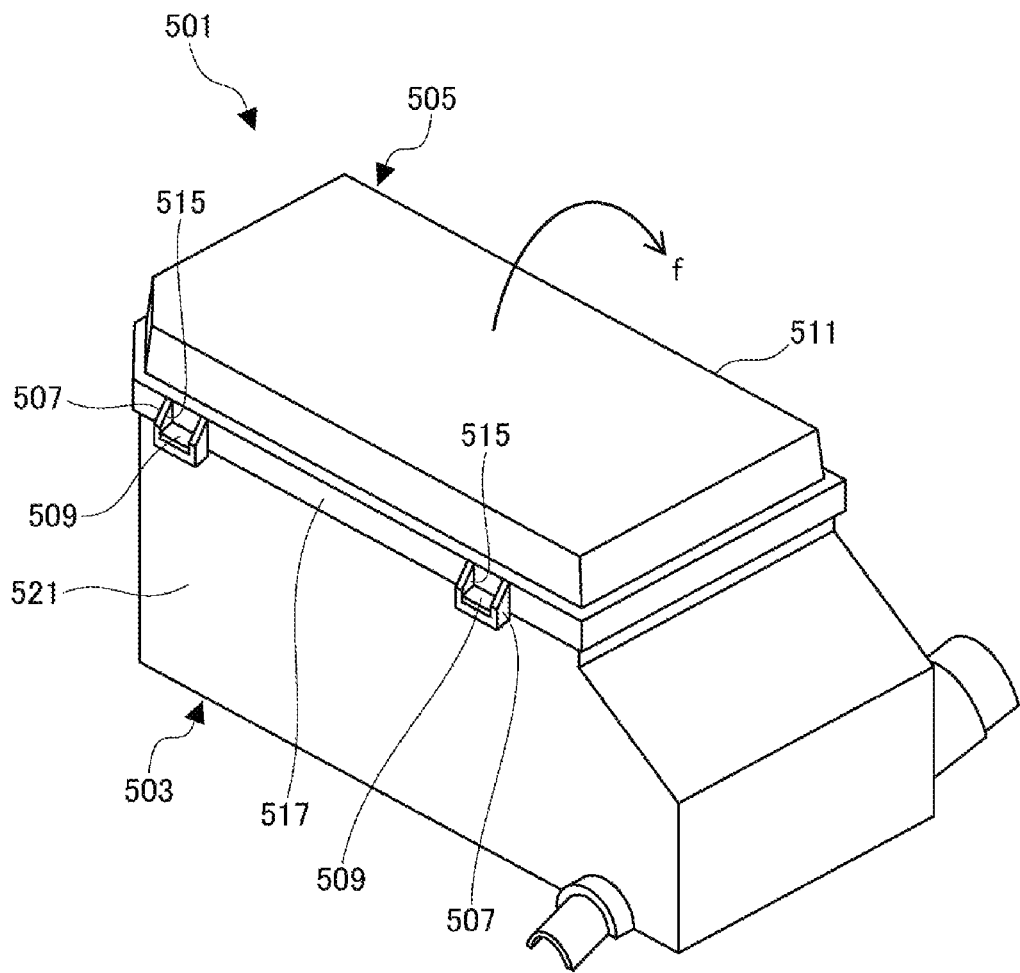
FIG. 8 is a perspective view illustrating an external appearance of an electric connection box in the related art.
Figure 9:
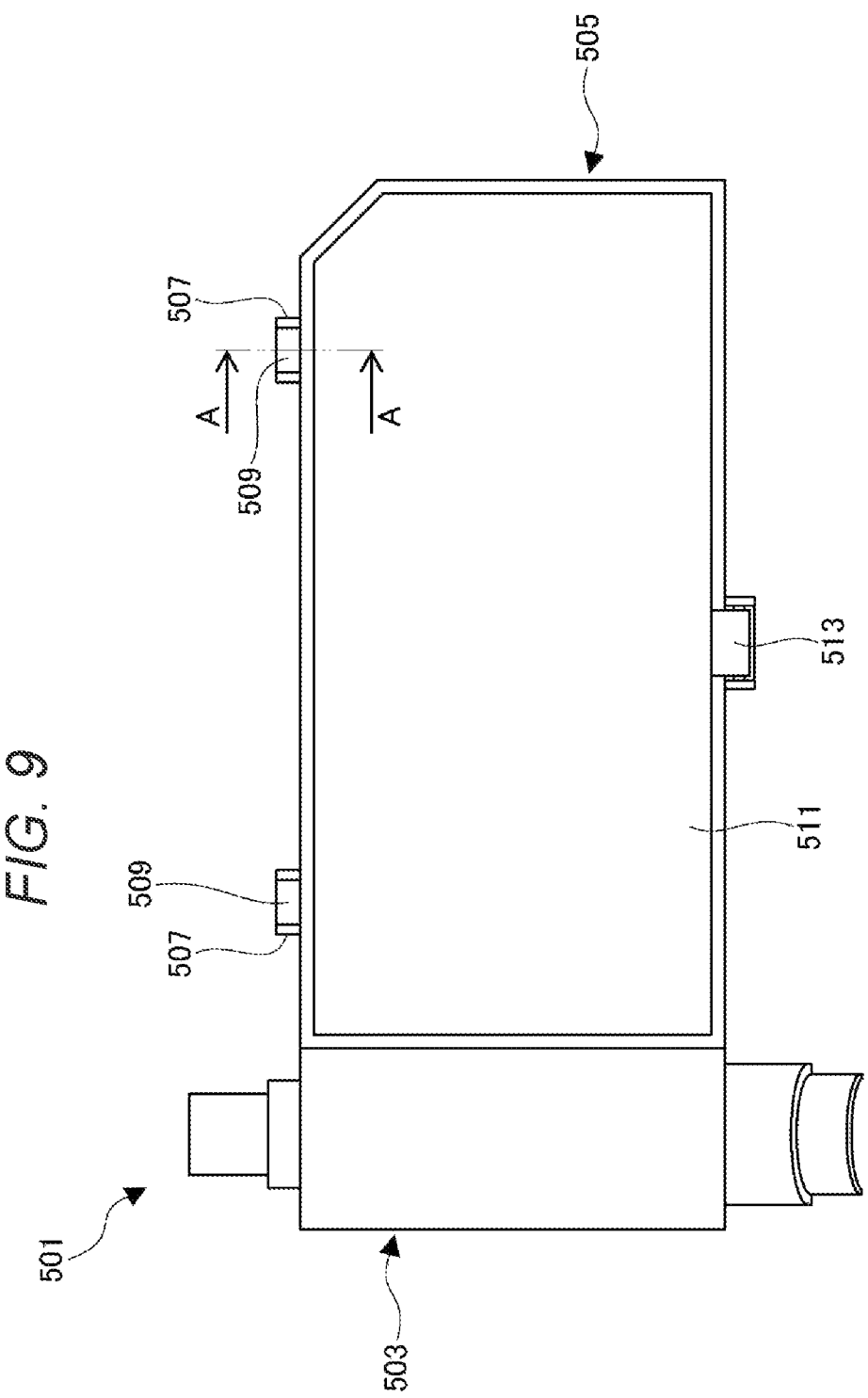
FIG. 9 is a plan view of the electric connection box in FIG. 8.
Figure 10:
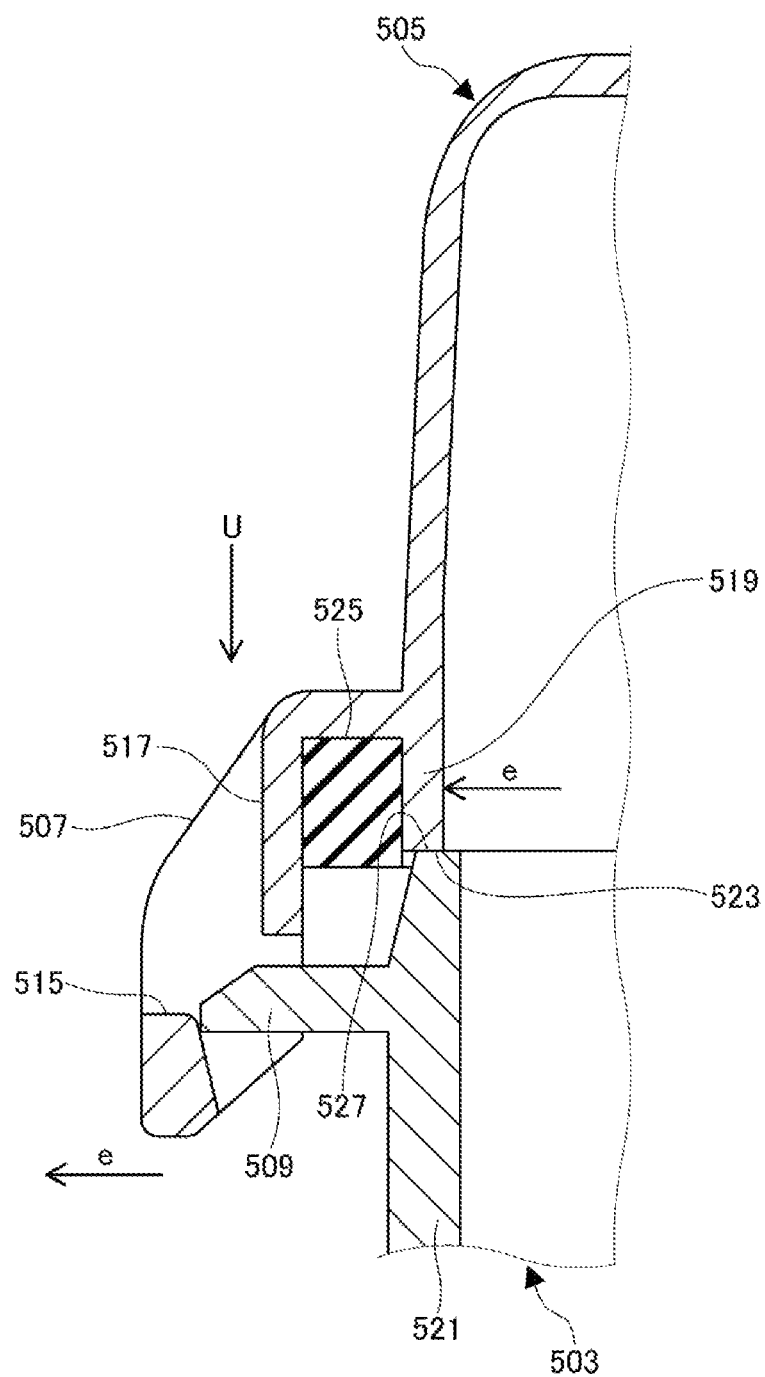
FIG. 10 is a sectional view taken along a line A-A in FIG. 9.

FIG. 7 is a sectional view taken along a line B-B in FIG. 2 and illustrates operation in a process for locking the hook 19 to the lock protruding plate 15. In vertical fitting, the lid 17 is attached by being moved in a substantially vertical direction V from above the housing 13 and covers the opening 29. A lower end of the hook 19 of the lid 17, which has been moved downward from above, abuts the lock protruding plate 15 projecting horizontally outward from the side wall 27 of the housing 13. As illustrated in a left view in FIG. 7, when an upper surface of the lid 17 in the vicinity of the hook 19 is pressed down, the hook 19 that receives a reaction force from the lock protruding plate 15 is elastically deformed outward (in a direction of an arrow e) relative to the side wall 27.

In the electric connection box 11 according to the present embodiment, the notches 23 obtained by cutting the lower tip end of the inner wall 21 are formed on the inner wall 21 that faces the hanging wall 53 on which the hooks 19 are formed. The notches 23 are formed on the inner wall 21 at least within a range corresponding to the range of the hanging wall 53 in which the hooks 19 are formed. Since the hooks 19 and the hanging wall 53 are integrally coupled, the inner wall 21 on which the notches 23 are formed is reduced in rigidity in the range in which the notches 23 are provided. The inner wall 21 on which the notches 23 are formed is connected to the top plate portion 73 of the lid 17 at upper ends thereof, the upper ends being opposite to the notches 23. A coupling strength between the inner wall 21, on which the notches 23 are formed, and the top plate portion 73 is larger than an outward tensile stress transmitted by the deformation of hooks 19. As a result, the inner wall 21 is prevented from being displaced outward. When the lid 17 is vertically fitted to the housing 13, the inner wall 21 is less likely to move to a position where the lower tip end thereof interferes with the upper end of the side wall 27 even when the hooks 19 are deformed outward. As a result, in the electric connection box 11 according to the present embodiment as illustrated in the right view in FIG. 7, the upper end of the side wall 27 and the lower tip end of the inner wall 21 are less likely to interfere with each other even when the lid 17 is fitted to the housing 13 vertically, therefore a situation in which the hooks 19 cannot be locked can be avoided.

In the electric connection box 11 according to the present embodiment, when the lid 17 is rotationally fitted or vertically fitted to the housing 13, the packing 31 attached in the annular packing accommodating groove 67 defined by and provided between the hanging wall 53 and the inner wall 21 makes a watertight contact with the packing abutment end surface 33 that is the upper ends of the side wall 27. As a result, the electric connection box 11 according to the present embodiment is sealed in a watertight manner by the packing 31 between the housing 13 and the lid 17. In the electric connection box 11 according to the present embodiment, since the lower tip end of the inner wall 21 does not interfere with the packing abutment end surface 33 that is the upper ends of the side wall 27 when the lid 17 is fitted to the housing 13, the lid 17 can reach a predetermined position and is fitted to the housing 13. The packing 31 is elastically deformed by receiving a predetermined pressing force from the packing abutment end surface 33, and contacts the packing abutment end surface 33 in a pressed manner by a repulsive force. As a result, the packing 31 and the packing abutment end surface 33 can reliably form a stable sealing surface that is continuous in a peripheral direction of the electrical connection box and at which the packing 31 and the packing abutment end surface 33 contact with each other in a pressed manner, and the reliability of the waterproof performance can be enhanced.

In the electric connection box 11 according to the present embodiment, the notches 23 are configured to be disposed in positions lower than the upper end of the side wall 27 when the lid 17 is fitted to the housing 13. When the lid 17 is fitted, the packing 31, which is held with its two side portions interposed in the packing accommodating groove 67 between the hanging wall 53 and the inner wall 21, is pressed against the packing abutment end surface 33. In such a case in general, portions corresponding to the notches 23 deform and protrude from the packing accommodating groove 67. However, in the electric connection box 11 according to the present embodiment, since the notches 23 are configured to be located, when the lid 17 is fitted to the housing 13, in positions lower than the upper end of the side wall 27, there is no gap between the packing abutment end surface 33 and the lower tip end of the inner wall 21 that opens in a direction orthogonal to a pressing direction of the packing 31 (i.e., lateral direction). As a result, the packing 31 can be restricted from protruding in the lateral direction, and the repulsive force for bringing the packing 31 into contact with the packing abutment end surface 33 in a pressed manner can be maintained at a predetermined pressure.

Further, in the electric connection box 11 according to the present embodiment, two reinforcing ribs 71 project on the inner surface 69 of the inner wall 21 in the range corresponding to the notches 23. The reinforcing ribs 71 project from the inner surface 69 of the inner wall 21 and extend linearly. Base ends of the reinforcing ribs 71 in an extending direction (i.e., direction in which the reinforcing ribs 71 extend) are connected to the top plate portion 73 of the lid 17. The inner wall 21 at portions where the notches 23 are formed has an increased coupling strength with the top plate portion 73 due to the reinforcement ribs 71. Accordingly, the coupling strength of the inner wall 21, on which the notches 23 are formed, with the top plate portion 73 is larger than the outward tensile stress transmitted by the deformation of the hooks 19. As a result, in the electric connection box 11, a situation in which the hook 19 cannot be locked can more reliably be prevented even when the lid 17 is fitted to the housing 13 vertically.

Therefore, according to the electric connection box 11 in the present embodiment, it is possible to prevent a situation in which of a hook, which is used in both cases in which the electric connection box employs rotational fitting and vertical fitting of the lid, cannot be locked, from occurring.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, a housing (13) having an opening (29) of a polygonal shape, the opening (29) being defined by an upper end of each of a plurality of side walls (27), a lock protruding plate (15) protruding from an outer surface of one of the plurality side walls (27), the one being along a side (47) of the opening (29), a lid (17) including a hanging wall (53) and being configured to be attached to the housing (13) while covering the opening (29), a hook (19) having a frame shape and an inner hole (55), an inner wall (21) protruding downward from the lid (17) and extending parallel to the hanging wall (53) and a notch (23) being obtained by cutting a lower tip end of the inner wall (21). The hanging wall (53) is configured, when the lid (17) is attached to the housing (13), to cover an outer side of each of the plurality of side walls (27). The hook (19) extends downward from an outer surface of the hanging wall (53) and is configured to rotate the lid (17) such that the lid (17) is attached to the housing (13) with the inner hole (55) being engaged with the lock protruding plate (15). The inner wall (21) is provided at an inner side than the hanging wall (53) on the lid (17) and is configured to, when the lid (17) is attached to the housing (13), to sandwich the one of the plurality side walls (27) between the hanging wall (53) and the inner wall (21). The notch is formed on the inner wall (21) in at least a second portion corresponding to a first portion of the hanging wall (53) on which the hook (19) is provided.

According to the electric connection box having the above described configuration, the lid can be attached to the housing in two ways of rotational fitting and vertical fitting. In rotational fitting, the lid is rotated about the hook with the hook provided on the lid being engaged with the lock protruding plate provided on the side wall. That is, a side of the lid on which the hook is provided serves as a rotation base portion (rotational axis), and a side of the lid opposite to the hook serves as a rotation tip end portion. The hook is provided on the hanging wall formed on the outer periphery of the lid. The hanging wall covers the outer side of the side wall of the housing. When the lid is rotated to a position where the hanging wall covers the upper end of the side wall, a lock portion provided on the lid and the housing locks so that the fixing of the lid to the housing is completed. Meanwhile, in vertical fitting, the lid is attached by being moved in a substantially vertical direction from above toward the housing and covers the opening. A lower end of the hook of the lid abuts against the lock protruding plate projecting outward from the side wall of the housing such that the lock protruding plate protruding in a direction which is orthogonal to the side wall. When an upper surface of the lid in the vicinity of the hook is pressed downward, the hook that receives a reaction force from the lock protruding plate is elastically deformed outward relative to the side wall. In the electric connection box having such a configuration, the notch obtained by cutting upward the lower tip end is formed on the inner wall that faces the hanging wall on which the hook is formed. The notch is formed on the inner wall at least within the range (second portion of the inner wall) corresponding to the range (first portion of the hanging wall) of the hanging wall on which the hook is formed. Since the hook and the hanging wall are integrally coupled, the inner wall on which the notch is formed is reduced in rigidity in the range in which the notch is provided. The inner wall on which the notch is formed is connected to a top plate portion of the lid at an upper end of the inner wall opposite to a portion of the inner wall where the notch is provided. A coupling strength between the inner wall, on which the notch is formed, and the top plate portion is larger than an outward tensile stress transmitted by the deformation hook. As a result, the inner wall is prevented from being displaced outward. When the lid is vertically fitted to the housing, the inner wall is less likely to move to a position where the lower tip end of the inner wall interferes with the upper end of the side wall even when the hook is deformed outward. As a result, in the electric connection box having such a configuration, the upper end of the side wall and the lower tip end of the inner wall are less likely to interfere with each other even in vertical fitting, so that a situation in which the hook cannot be locked is prevented.

The lid (17) may further include a packing accommodating groove (67) provided between the hanging wall (53) and the inner wall (21) of the lid (17), the packing accommodating groove (67) being configured such that an annular packing (31) is attached into the packing accommodating groove (67).

In the electric connection box having the above described configuration, when the lid is rotationally fitted or vertically fitted to the housing, the packing attached in the annular packing accommodating groove defined and provided between the hanging wall and the inner wall makes a watertight contact with a packing abutment end surface that is the upper end of the side wall. As a result, the electric connection box having such a configuration is sealed in a watertight manner by the packing between the housing and the lid. In the electric connection box having such a configuration, since the lower tip end of the inner wall does not interfere with the packing abutment end surface that is the upper end of the side wall when the lid is fitted to the housing, the lid can reach a predetermined position and is fitted to the housing. The packing is elastically deformed by receiving a predetermined pressing force from the packing abutment end surface, and comes into contact with the packing abutment end surface in a pressed manner by a repulsive force. As a result, the packing and the packing abutment end surface can reliably form a stable sealing surface that is continuous in a peripheral direction of the electrical connection box and at which the packing and the packing abutment end surface are in contact with each other in a pressed manner, and the reliability of the waterproof performance can be enhanced.

The notch (23) may be configured to be located when the lid is attached to the housing (13), in a position lower than the upper end of the side wall (27).

According to the electric connection box having the above described configuration, when the lid is fitted to the housing, the packing, which is held, with its two side portions contacting the hanging wall and the inner wall, in the packing accommodating groove between the hanging wall and the inner wall, is pressed against the packing abutment end surface. Under such a situation, generally, a portion of the packing corresponding to the portion of the inner wall where the notch is provided deforms and protrudes from the packing accommodating groove. However, in the electric connection box having the configuration, since the notch is located, when the lid is attached to the housing, in the position lower than the upper end of the side wall, there is no gap between the packing abutment end surface and the lower tip end of the inner wall that opens in a direction orthogonal to a pressing direction of the packing (i.e., lateral direction). As a result, the packing can be restricted from protruding in the lateral direction, and the repulsive force for bringing the packing into contact with the packing abutment end surface in a pressed manner can be maintained at a predetermined pressure.

The lid (17) may further include at least one reinforcing rib (71) protruding on an inner surface (69) of the inner wall (21) in the second portion.

According to the electric connection box having the above described configuration, a base end in an extending direction of the reinforcing rib, which projects from the inner surface of the inner wall and linearly extends, is connected to the top plate portion of the lid. The inner wall at the portion where the notch is formed has an increased coupling strength with the top plate portion due to the reinforcement rib. Accordingly, the coupling strength between the inner wall and the top plate portion is larger than the outward tensile stress transmitted by the deformation of the hook. As a result, in the electric connection box having the configuration, a situation in which the hook cannot be locked can more reliably be prevented even when the lid is attached to the housing vertically.

What is claimed is:

1. An electric connection box comprising:
  a housing having an opening of a polygonal shape, the opening being defined by an upper end of each of a plurality of side walls;
  a lock protruding plate protruding from an outer surface of one of the plurality side walls, the one being along a side of the opening;
  a lid including a hanging wall and being configured to be attached to the housing while covering the opening;
  a hook having a frame shape and an inner hole;
  an inner wall protruding downward from the lid and extending parallel to the hanging wall; and
  a notch being obtained by cutting a lower tip end of the inner wall,
  wherein the hanging wall is configured, when the lid is attached to the housing, to cover an outer side of each of the plurality of side walls,
  wherein the hook extends downward from an outer surface of the hanging wall and is configured to rotate the lid such that the lid is attached to the housing with the inner hole being engaged with the lock protruding plate,
  wherein the inner wall is provided at an inner side than the hanging wall on the lid and is configured to, when the lid is attached to the housing, to sandwich the one of the plurality side walls between the hanging wall and the inner wall,
  wherein the notch is formed on the inner wall only in a second portion corresponding to a first portion of the hanging wall on which the hook is provided.

2. The electric connection box according to claim 1, wherein the lid further includes a packing accommodating groove provided between the hanging wall and the inner wall of the lid, the packing accommodating groove being configured such that an annular packing is attached into the packing accommodating groove.

3. The electric connection box according to claim 2, wherein the notch is configured to be located, when the lid is attached to the housing, in a position lower than the upper end of the side wall.

4. The electric connection box according to claim 1, wherein the lid further includes at least one reinforcing rib protruding on an inner surface of the inner wall in the second portion.

5. The electric connection box according to claim 1, wherein side ends of the notch are chamfered with chamfers at a boundary between the notch and the lower tip end of the inner wall.

* * * * *